(12) United States Patent
Natsume et al.

(10) Patent No.: US 10,661,267 B2
(45) Date of Patent: May 26, 2020

(54) ELECTRIC PIPETTE SYSTEM, ELECTRIC PIPETTE, AND OPERATING PROCEDURE DISPLAY DEVICE

(71) Applicants: NATIONAL INSTITUTE OF ADVANCED INDUSTRIAL SCIENCE AND TECHNOLOGY, Tokyo (JP); Kabushiki Kaisha Yaskawa Denki, Kitakyushu-shi, Fukuoka (JP); ROBOTIC BIOLOGY INSTITUTE INC., Tokyo (JP)

(72) Inventors: Toru Natsume, Tokyo (JP); Naoyuki Sasaki, Tokyo (JP); Kenji Matsukuma, Kitakyushu (JP); Makoto Umeno, Kitakyushu (JP); Tatsuro Ipposhi, Kitakyushu (JP)

(73) Assignees: NATIONAL INSTITUTE OF ADVANCED INDUSTRIAL SCIENCE AND TECHNOLOGY, Tokyo (JP); KABUSHIKI KAISHA YASKAWA DENKI, Fujuoka (JP); ROBOTIC BIOLOGY INSTITUTE INC., Tokyo (JP)

(*) Notice: Subject to any disclaimer, the term of this patent is extended or adjusted under 35 U.S.C. 154(b) by 0 days.

(21) Appl. No.: 15/447,110

(22) Filed: Mar. 2, 2017

(65) Prior Publication Data

US 2017/0173576 A1 Jun. 22, 2017

Related U.S. Application Data

(63) Continuation of application No. PCT/JP2014/073264, filed on Sep. 3, 2014.

(51) Int. Cl.
*B01L 3/02* (2006.01)
*G01N 35/10* (2006.01)
*G01N 35/00* (2006.01)

(52) U.S. Cl.
CPC ........ *B01L 3/0237* (2013.01); *G01N 35/1011* (2013.01); *G01N 35/1016* (2013.01);
(Continued)

(58) Field of Classification Search
CPC combination set(s) only.
See application file for complete search history.

(56) References Cited

U.S. PATENT DOCUMENTS

| 4,478,094 A | 10/1984 | Salomaa et al. |
| 2002/0020233 A1 | 2/2002 | Baba et al. |

(Continued)

FOREIGN PATENT DOCUMENTS

| JP | S59-147268 A | 8/1984 |
| JP | H07-505716 A | 6/1995 |

(Continued)

OTHER PUBLICATIONS

Search Report dated Feb. 5, 2018, for corresponding EP Patent Application No. 14901146.2.

(Continued)

*Primary Examiner* — Brian R Gordon
(74) *Attorney, Agent, or Firm* — HEA Law PLLC

(57) ABSTRACT

Provided is an electric pipette system, including: an operating condition receiving milt configured to receive an operating condition of a manipulation operation to foe occur next; a suction/discharge operating unit configured to perform at least any one of a suction operation and a discharge operation of a liquid by an electric pipette based cm the operating condition; an information collecting unit configured to collect various types of information during the suction operation or the discharge operation of the liquid; and an information recording unit configured to record the information.

11 Claims, 9 Drawing Sheets

(52) U.S. Cl.
CPC ... *B01L 2200/141* (2013.01); *B01L 2200/143* (2013.01); *B01L 2300/021* (2013.01); *B01L 2300/023* (2013.01); *B01L 2300/024* (2013.01); *B01L 2300/027* (2013.01); *B01L 2300/0627* (2013.01); *G01N 2035/00891* (2013.01); *G01N 2035/1062* (2013.01)

(56) References Cited

U.S. PATENT DOCUMENTS

| | | |
|---|---|---|
| 2002/0199094 A1* | 12/2002 | Strand .................. B01J 19/0093 713/150 |
| 2005/0118069 A1 | 6/2005 | Solotareff et al. |
| 2007/0056351 A1 | 3/2007 | Curtis et al. |
| 2008/0031774 A1* | 2/2008 | Magnant ................ B01L 3/5085 422/63 |
| 2008/0274552 A1* | 11/2008 | Guthrie ................... B01L 3/545 436/8 |
| 2010/0199789 A1 | 8/2010 | Magnussen et al. |
| 2012/0046883 A1* | 2/2012 | Ayliffe .................... B01L 3/021 702/26 |
| 2012/0118954 A1 | 5/2012 | Hagen et al. |
| 2014/0175168 A1 | 6/2014 | Hagen et al. |
| 2017/0131186 A1* | 5/2017 | Williams ............. G01N 1/2273 |
| 2017/0370956 A1* | 12/2017 | Hurwitz ................. B01L 3/021 |
| 2018/0004550 A1* | 1/2018 | Nilsson ............ B01L 3/502715 |
| 2019/0152674 A1* | 5/2019 | Boraso ................. A01N 1/0273 |

FOREIGN PATENT DOCUMENTS

| | | |
|---|---|---|
| JP | 2002-113373 A | 4/2002 |
| JP | 2007-520719 A | 7/2007 |
| JP | 2012-233867 A | 11/2012 |
| JP | 2013-542450 A | 11/2013 |
| JP | 2013-543438 A | 12/2013 |
| JP | 2014-147986 A | 8/2014 |
| WO | 93/22534 A | 10/1993 |
| WO | 2005/085775 A1 | 9/2005 |
| WO | 2012/045417 A2 | 4/2012 |
| WO | 2012/064940 A1 | 5/2012 |
| WO | 2012/069925 A1 | 5/2012 |
| WO | 2015/189464 A1 | 12/2015 |

OTHER PUBLICATIONS

English Translation of International Search Report for PCT/JP2014/073264 dated Mar. 10, 2016.

Office Action dated May 22, 2018, for corresponding JP Patent Application No. 2016-546254 and partial translation thereof.

"Brief Explanation of 21CFR Part 11"(Yasuo Mikami, "Automation", vol. 47, No. 10, pp. 30-34, p/b. Nikkan Kogyo Publication Production).

Office Action of Aug. 14, 2018, for corresponding JP Patent Application No. 2016-546254 and English translation thereof.

* cited by examiner

ELECTRIC PIPETTE SYSTEM, ELECTRIC PIPETTE, AND OPERATING PROCEDURE DISPLAY DEVICE

The present disclosure contains subject matter related to that disclosed in International Patent Application under the PCT PCT/JP2014/073264 filed in the Japan Patent Office on Sep. 3, 2014, the entire contents of which are hereby incorporated by reference.

BACKGROUND OF THE INVENTION

Field of the Invention

The present invention relates to an electric pipette system, an electric pipette, and an operating procedure display device.

Description of the Related art

In fields like biology and chemistry, in particular, there is known an electric pipette to be used in a dispensing manipulation of a liquid. For example, in JP 2012-113373 A, there is disclosed a pipette device including an electric motor and being configured to suck or discharge a liquid by switching between a manual manipulation and an electric manipulation.

SUMMARY OF THE INVENTION

According to one embodiment of the present invention, there is provided an electric pipette system, including: an operating condition receiving unit configured to receive an operating condition of a manipulation operation to be occur next; a suction/discharge operating unit configured to perform at least any one of a suction operation and a discharge operation of a liquid by an electric pipette based on the operating condition; an in format ion collecting unit configured to collect various types of information during the suction operation or the discharge operation of the liquid; and an information recording unit configured to record the carious types of information.

According to another embodiment of the present invention, there is provided an electric pipette to be used in the electric pipette systems described above, the electric pipette including an information transmission unit configured to transmit information to the information collecting unit.

According to still another embodiment of the present invention, there is provided an operating procedure display device to be used in the electric pipette system described above, the operating procedure display device including an operating condition transmission unit configured to transmit the operating condition to the operating condition receiving unit.

DESCRIPTION OF THE EMBODIMENTS

According to the knowledge of the inventors of the present invention, in fields like biology and chemistry, in particular, in order to ensure reproducibility of an experiment result, the manipulations to be performed during the experiment need to be performed based on an experiment plan determined in advance. For example, when the experiment is a pre-treatment in biotechnology, the manipulations most be performed based on a so-called protocol. In order to ensure the objectivity of the experiment result, it is necessary to accurately record what type of manipulations has been performed in the experiment process. In order to accurately record such information, an experiment operator needs to accurately set a suction amount or a discharge amount of liquid by a pipette in accordance with the experiment plan for each dispensing operation using the pipette, and record a record of that suction or discharge in a laboratory notebook, for example.

Such an operation may induce human error, and hence it cannot be said that reproducibility of the experiment result is always ensured. Further, the record of the laboratory notebook does not objectively prove the accuracy of the experiment result, and hence the objectivity of the experiment result, is also insufficient.

In view of those circumstances, the inventors of the present invention have invented a novel and creative electric pipette system and electric pipette by performing diligent research and development regarding how to ensure the reproducibility and the objectivity of the experiment result, namely, how to accurately perform a manipulation during the experiment and now to reliably record that manipulation. The electric pipette system and electric pipette are now described by way of an embodiment thereof.

Figure 1:
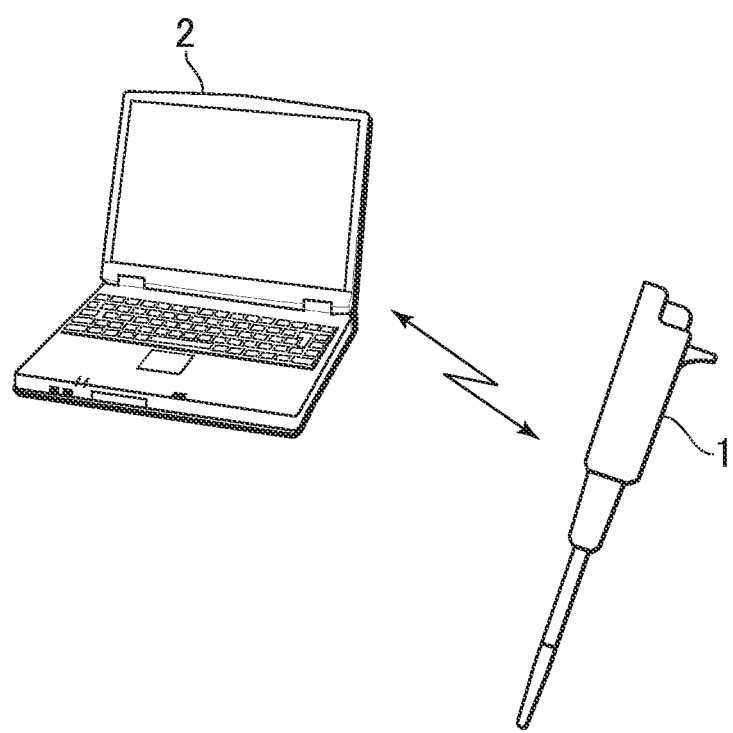
FIG. 1 is a schematic diagram for illustrating a configuration of an electric pipette system according to a first embodiment of the present invention.

FIG. 1 is a schematic diagram for illustrating a configuration of art electric pipette system 100 according to a first embodiment of the present invention. The electric pipette system 100 includes at least an electric pipette 1 and an operating procedure display device 2. The electric pipette 1 and the operating procedure display device 2 are connected in a manner that enables those components to communicate to and from each other by an arbitrary method. The information may be communicated wirelessly or via a cable. However, a wireless connect ion is preferred from the perspective that the connection cable does not interfere with experiment operations. The standard to be used for the wireless connection is not particularly limited, and for example, a wireless local area network (LAN) like Institute of Electrical and Electronics Engineers (IEEE) 802.11a/b/g/n, or a common standard like Bluetooth (trademark), may be used.

Figure 2:
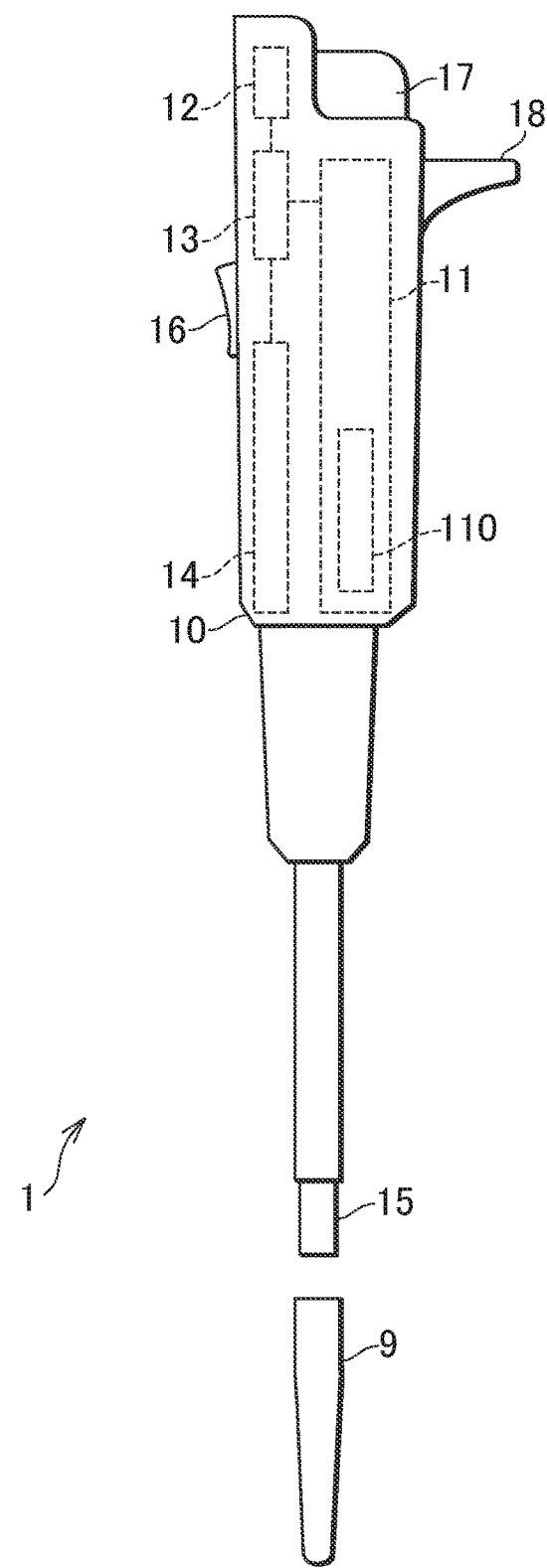
FIG. 2 is a schematic diagram far illustrating a configuration of an electric pipette.

FIG. 2 is a schematic diagram for illustrating the configuration of the electric pipette 1. The electric pipette 1 is a so-called pipette configured to measure a liquid by using a chip 9 detachably mounted to a tip of the electric pipette 1, and suck or discharge the measured liquid, and configured to use an arbitrary motive force, for example, a motive force from an electric motor, to perform the suction/discharge operation. The electric pipette 1 illustrated in FIG. 2 is based on an assumption that an experiment operator holds the electric pipette 1 in his or her hand, bat as described in an embodiment described later, the electric pipette 1 may also be manipulated by a transport apparatus, for example, a manipulator (i.e., a so-called industrial robot).

In the electric pipette 1, a drive unit 11 for sucking and discharging a liquid, a communication unit 12, a control unit 13, and an information acquisition unit 14 are housed in a case 10, which is a housing. A chip connection portion 15 to which the chip 9 is detachably mounted is arranged at a tip of the case 10. A manipulation unit 16 that allows the experiment operator to issue an operation instruction and an eject button 17 for releasing the chip 9 from the chip connection portion 15 are arranged on an external side of the case 16. Reference numeral 18 represents a guide that serves as a support when the experiment operator grasps the electric pipette 1.

The drive unit 11 is a part for sucking liquid into the chip 9 and discharging the liquid from the chip 9 by using the electric pipette 1. In this embodiment, the drive unit 11 is configured to drive air in a cylinder in and out of the cylinder by causing an electric motor (not shown) to move a plunger 110 in a longitudinal direction of the cylinder. As a result, the liquid is sucked into or discharged from the chip 9 connected to the chip connection portion 15. The suction amount or the discharge amount of the liquid at this time is controlled by the movement amount of the plunger 110.

The communication unit 12 is an interface for information communication to and from the operating procedure display device 2 illustrated in FIG. 1. In this embodiment, because the information communication is performed wirelessly, the communication unit 12 includes a suitable communication controller and an antenna. The communication unit 12 may also include a connector for wired communication, and may be configured to perform the information communication wirelessly or via a cable.

The control unit 13 is a controller configured to control the overall operation of the electric pipette 1. It is preferred that the control unit 13 be built from a compact part suited to built-in application, for example, a so-called micro controller, an application specific integrated circuit (ASIC), or a field programmable gate array (FPGA). However, the control unit 13 is not limited to those examples, and any known information processing device may be used.

The information acquisition unit 14 is configured to collect various types of information on the electric pipette 1, and to transmit the collected information to the control unit 13. The information to be collected by the information acquisition unit 14 may be various types of information. Examples of the information include a date and time of when a manipulation has been performed by the electric pipette 1, whether suction or discharge has been performed, the suction or discharge amount, an amount of liquid detected in the chip 9, an identification (ID) of the experiment operator manipulating the electric pipette 1, a position of the electric pipette 1, and a temperature and pH of the liquid in the chip 9. Handling of the information collected by the information acquisition unit 14 is described later.

The manipulation unit 16 is a part configured to foe manipulated in order to instruct the electric pipette 1 to suck and discharge the liquid. In this embodiment, the manipulation unit 16 is a posh button, but the specific Configuration of the manipulation unit 16 is not particularly limited.

The basic operation of the above-mentioned, electric pipette 1 is to suck/discharge a liquid by causing, each time the experiment operator manipulates the manipulation unit 16, the control unit 13 to drive the drive unit 11 in accordance with that manipulation. The manipulation of the manipulation unit 16 causes a drive condition of the drive unit 11, for example, whether suction or discharge is to be performed, and how much liquid is to be sucked or discharged, to be read based on communication from, the operating procedure display device 2 via the communication unit 12, and set by the control unit 13. Various types of information during operation of the electric pipette 1 is collected by the information acquisition unit 14, and transmitted to the operating procedure display device 2 by the control unit 13 via the communication unit 12.

Figure 3:
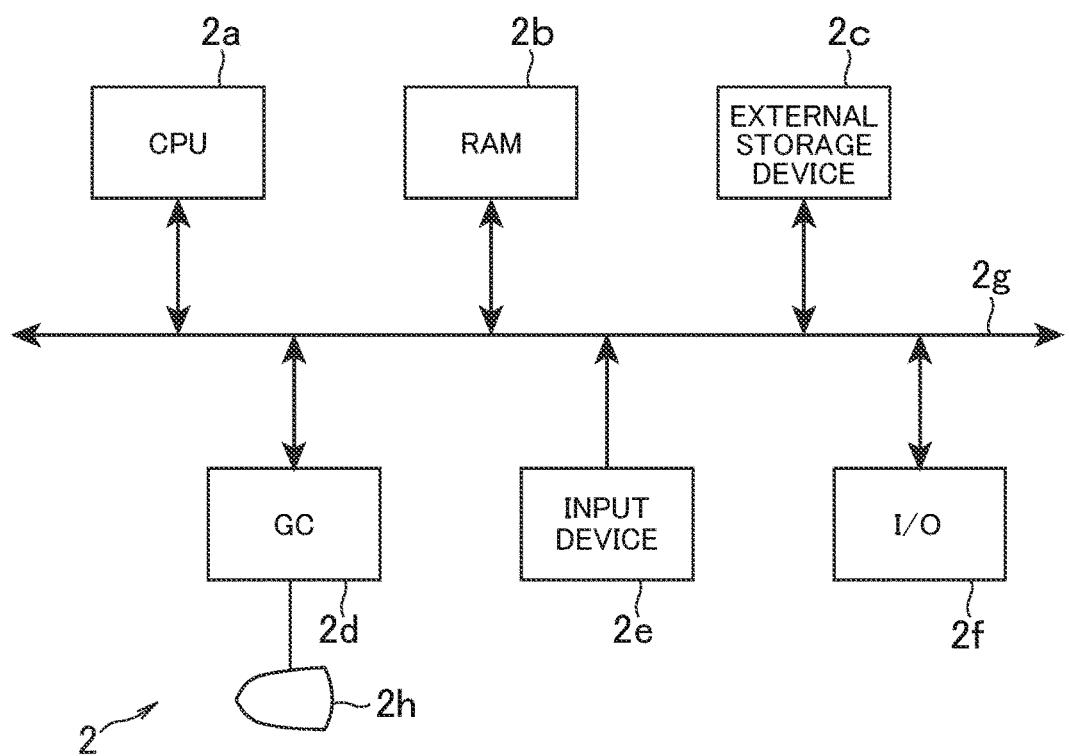
FIG. 3 is a block diagram for illustrating a physical configuration of an operating procedure display device.

FIG. 3 is a block diagram for illustrating a physical configuration of the operating procedure display device 2. In this example, the operating procedure display device 2 is a general computer, in which a central, processing unit (CPU) 2a, a random access memory (RAM) 2b, an external storage device 2c, a graphics controller (GC) 2d, an input device 2e, and an input/output (I/O) 2f are connected by a data bus 2g in a manner that allows those parts to transmit and receive electrical signals to and from each other. The external storage device 2c, which is a device capable of statically recording information, may be a hard disk drive (HDD) or a solid stats drive (SSD), for example. The signal from the GC 2d is output and displayed as an image on a monitor 2h that allows a user to visually recognize the image. The monitor 2h is, for example, a flat panel display. The input device 2e is a device that allows the user to input information. The input device 2e is, for example, a keyboard, a mouse, or a touch panel. The I/O 2f is an interface that allows the operating procedure display device 2 to transmit and receive information to and from an external device. In this example, because the operating procedure display device 2 performs information communication to and from the electric pipette 1 wirelessly, the I/O 2f includes at least a communication controller and an antenna. The I/O 2f may also include a connector for wired connection, and may be connected via a cable to an external device for per forming wireless communication to and from the electric pipette 1. When the operating procedure display device 2 and the electric pipette 1 are connected via a cable, it is not necessary for the I/O 2f to include a part for wireless communication.

The basic operations of the operating procedure display device 2 are to display on the monitor 2h, for example, a procedure of the operations to be performed by the experiment operator, to transmit and set in the electric pipette 1 the operating condition of the electric pipette 1 during the procedure to be executed, for example, whether the liquid is to be sucked or discharged, and the suction or discharge amount, and to record various types of information received from the electric pipette 1 during operation of the electric pipette 1.

The operating procedure display device 2 may have a function for creating an operating procedure. In that case, the operating procedure display device 2 is also an operating procedure creation device. The term "operating procedure" as used herein refers to a series of manipulations, and the conditions of those manipulations, to be performed in an experiment in fields like biology and chemistry. A so-called protocol in biotechnology is a representative example of such an operating procedure.

The operating procedure display device 2 may be a dedicated device, or may be implemented using a general computer having the parts illustrated in FIG. 3. In that case, a computer program is executed to cause the computer to function as the operating procedure display device 2. The computer program may be stored on a computer-readable information storage medium, for example, various types of optical discs and a semiconductor memory. It is preferred that the computer program be installed in the computer from such a medium. The computer program may also be downloaded into the computer from various types of information communication networks, for example, the Internet. The computer program may also be implemented by so-called cloud computing, in which the functions of the computer program are provided by a server at a remote location via an information communication network.

Figure 4:
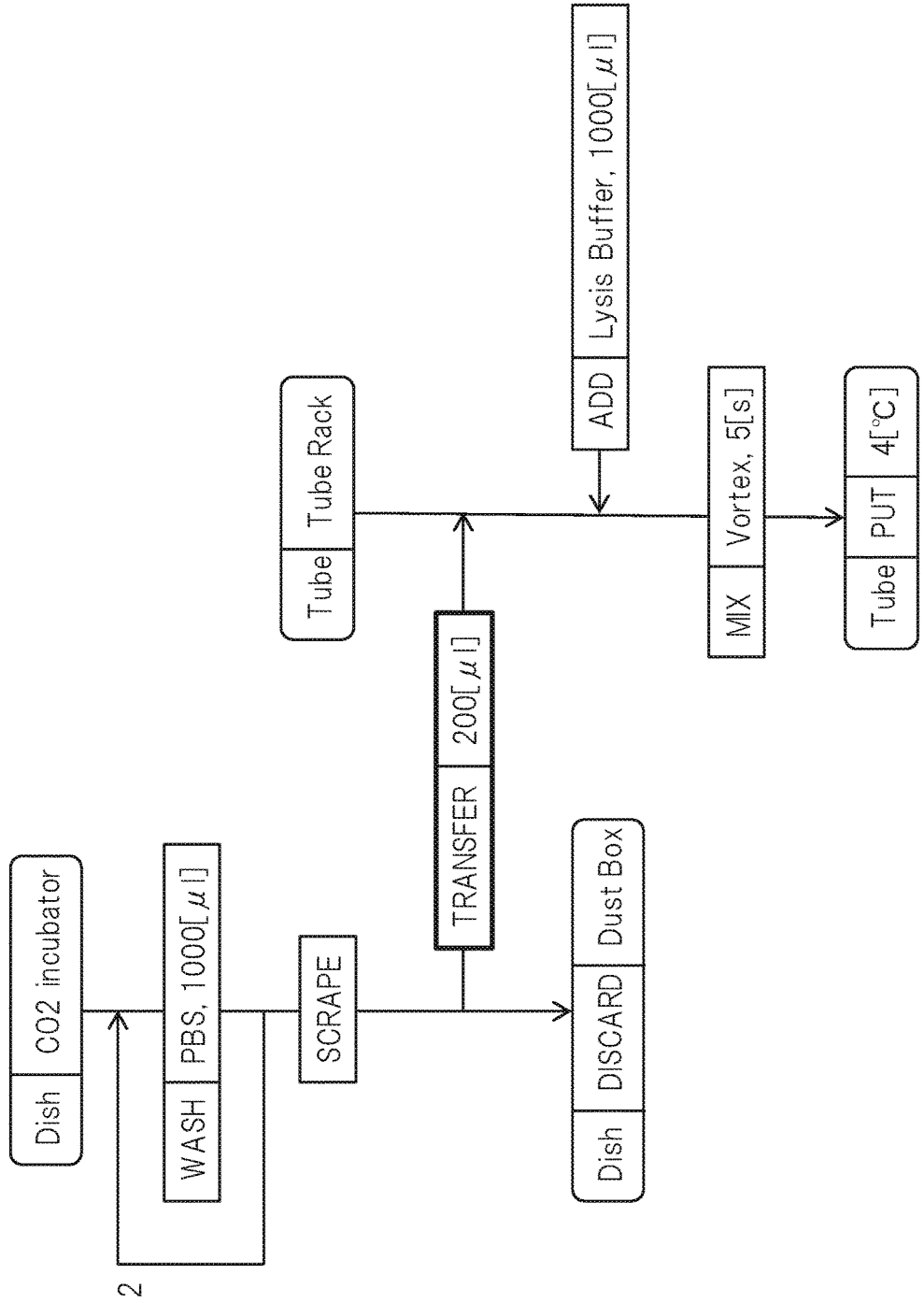
FIG. 4 is a diagram for illustrating an example of an operating procedure to be displayed on a monitor of the operating procedure display device.

FIG. 4 is a diagram for illustrating an example of the operating procedure to be displayed on the monitor 2h of the operating procedure display device 2. The operating procedure illustrated in FIG. 4 is an example of a biotechnology protocol. In this operating procedure, on a Petri dish containing a sample stored in a carbon dioxide gas atmosphere culture incubator, cell washing is performed twice and scraping is also performed. Then, the sample is transferred to a microtube, a cell lysis buffer solution is added, the resultant solution is stirred with a vortex mixer, and then stored in a 4° C. thermostatic bath. In the operating procedure, the rectangular boxes having square corners represent each manipulation, and the rectangular boxes having rounded corners represent an initial state and a final stats of the sample container. The arrows indicate the manipulation order or the transfer direction of the sample.

A detailed description of each manipulation illustrated in FIG. 4 is omitted here because those manipulations are not directly related to the present invention. However, in FIG. 4, "Dish" refers to the Petri dish, "Tube" refers to the microtube, "WASH" refers to the cell washing, "SCRAPE" refers to the scraping, "DISCARD" refers to the discarding of the sample container, "TRANSFER" refers to the transfer of the contents, "ADD" refers to the addition and stirring of the sample solution, and "PUT" refers to the storage of the sample container. The experiment operator can grasp the order and condition of each manipulation by operating while looking at such an operating procedure.

Figure 5:
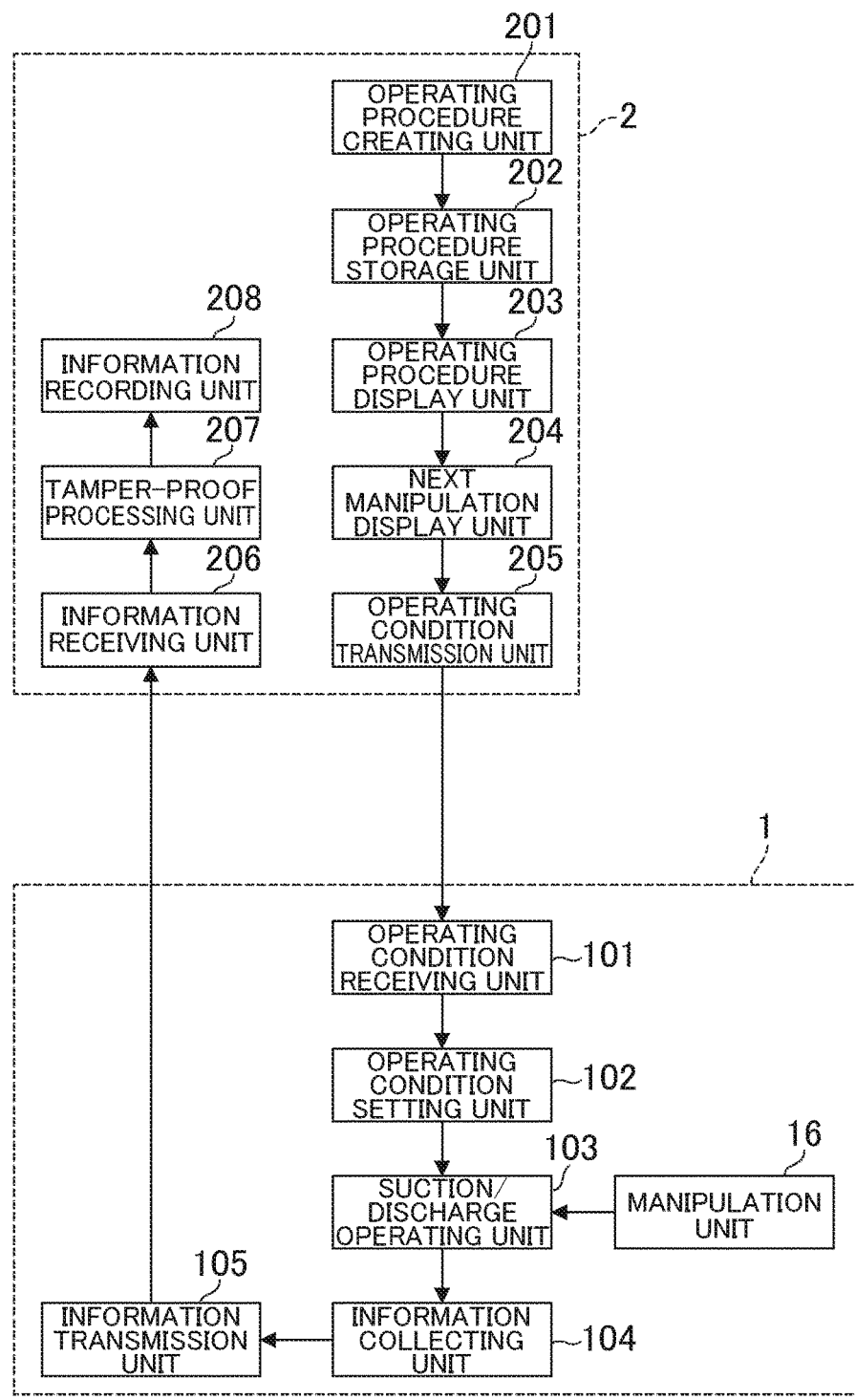
FIG. 5 is a function block diagram of the electric pipette system according to the first embodiment of the present invention.

FIG. 5 is a function block diagram of the electric pipette system 100 according to this embodiment. For ease of understanding, each of the blocks illustrated in FIG. 5 is individually shown as focusing on the function of each device. However, it is not always necessary for the physical parts to be separated into each of the blocks illustrated in FIG. 5. The blocks may be implemented by appropriately using the physical parts illustrated in FIG. 2 for the electric pipette 1 and illustrated in FIG. 3 for the operating procedure display device 2.

Regarding the electric pipette 1, an operating condition receiving unit 101 is configured to receive the operating condition transmitted from an operating condition transmission unit 205 in the operating procedure display device 2. The operating condition referred to herein includes whether suction or discharge is to be performed, and the suction or discharge amount, during the manipulation to be performed by the experiment operator. An operating condition setting unit 102 is configured to set the condition for driving the drive unit 11 when the manipulation is performed by the manipulation unit 16 based on the operating condition received by the operating condition receiving unit 101. In other words, the operating condition setting unit 102 is configured to set the direction in which the plunger 110 is to be moved and by how much the plunger 110 is to be moved. A suet ion/discharge operating unit 103 is configured to drive, when a manipulation is performed by the manipulation unit 16, the drive unit 11 and to suck or discharge the liquid based on the operating condition set by the operating condition setting unit 102. An information collecting unit 104 is configured to collect information indicating a state of the electric pipette 1 during operation. An information transmission unit 105 is configured to transmit the collected information to the operating procedure display device 2.

Regarding the operating procedure display device 2, an operating procedure creating unit 201 is configured to create an operating procedure by using an appropriate graphical user interface (GUI), for example. When an operating procedure created by another device is to be used, for example, the operating procedure creating unit 201 may be omitted. The created operating procedure is stored in an operating procedure storage unit 202.

An operating procedure display unit 203 is configured to display on the monitor 2h the operating procedure stored in the operating procedure storage unit 202. A next manipulation display unit 204 is configured to display, in the displayed operating procedure, the manipulation to be performed next by the experiment operator In a manner that allows the experiment operator to discriminate the displayed next manipulation from other manipulations. For example, in the operating procedure illustrated in FIG. 4, when the manipulation to be executed next is to transfer the sample from the Petri dish to the micro tube, as illustrated in FIG. 4, the manipulation may be displayed in a highlighted manner, for example, by displaying in bold the box written as "TRANSFER" indicating that manipulation. This enables the experiment operator to immediately understand the manipulation to be performed next, and prevents human error, for example, making a mistake in the manipulation procedure.

The operating condition transmission unit 205 is configured to transmit to the operating condition receiving unit 101 in the electric pipette 1 the condition for operating the electric pipette 1 in the manipulation to be performed next by the experiment operator. For example, when the next manipulation is the "TRANSFER" illustrated in FIG. 4, because that manipulation is to sack 200 μl of liquid and then discharge the same amount of liquid, the operating condition is transmitted such that first 200 μl is sucked.

An information, receiving unit 206 is configured to receive the information transmitted from the information transmission unit 105 of the electric pipette 1. The received information is subjected to tamper-proof processing by a tamper-proof processing unit 207, and is sequentially recorded in an information recording unit 208. As a result of the tamper-proof processing, the information recorded in the information recording unit 203 cannot be subsequently deliberately modified, and hence the objective accuracy of that information is ensured. The tamper-proof processing may be arbitrary processing that prevents tampering of electronic data in information processing, or that enables tampering to be detected. Examples of the tamper-proof processing may include adding a hash value based on a specific hash function and adding an error-detecting code like checksum and a cyclic redundancy check (CRC). From the perspective of resistance to tampering, it is desired to add a so-called electronic signature based on public key cryptography.

Thus, because the condition for operating the electric pipette 1 is transmitted to and set in the electric pipette 1 based on an operating procedure created in advance, human error, like making a setting mistake, is prevented, and it is not necessary to perform a manipulation every time the manipulation is to be set, which reduces the work and effort required for the experiment.

The information recorded in the information recording unit 208 is an objective record of the manipulation actually performed using the electric pipette 1. Therefore, the information can be utilized as a highly reliable experiment record that excludes arbitrary modifications by the experiment operator, human error, and subsequent tampering of the record. Through storing of the information recorded in the information recording unit 208 together with information on the operating procedure that the experiment complied with, and storing of the information recorded in the information recording unit 208 together with information on an analysis result performed downstream by an analysis device, a record of the experiment procedure and the fact that the experiment has been performed, as well as the analysis result of the experiment, may be handled collectively.

Figure 6:
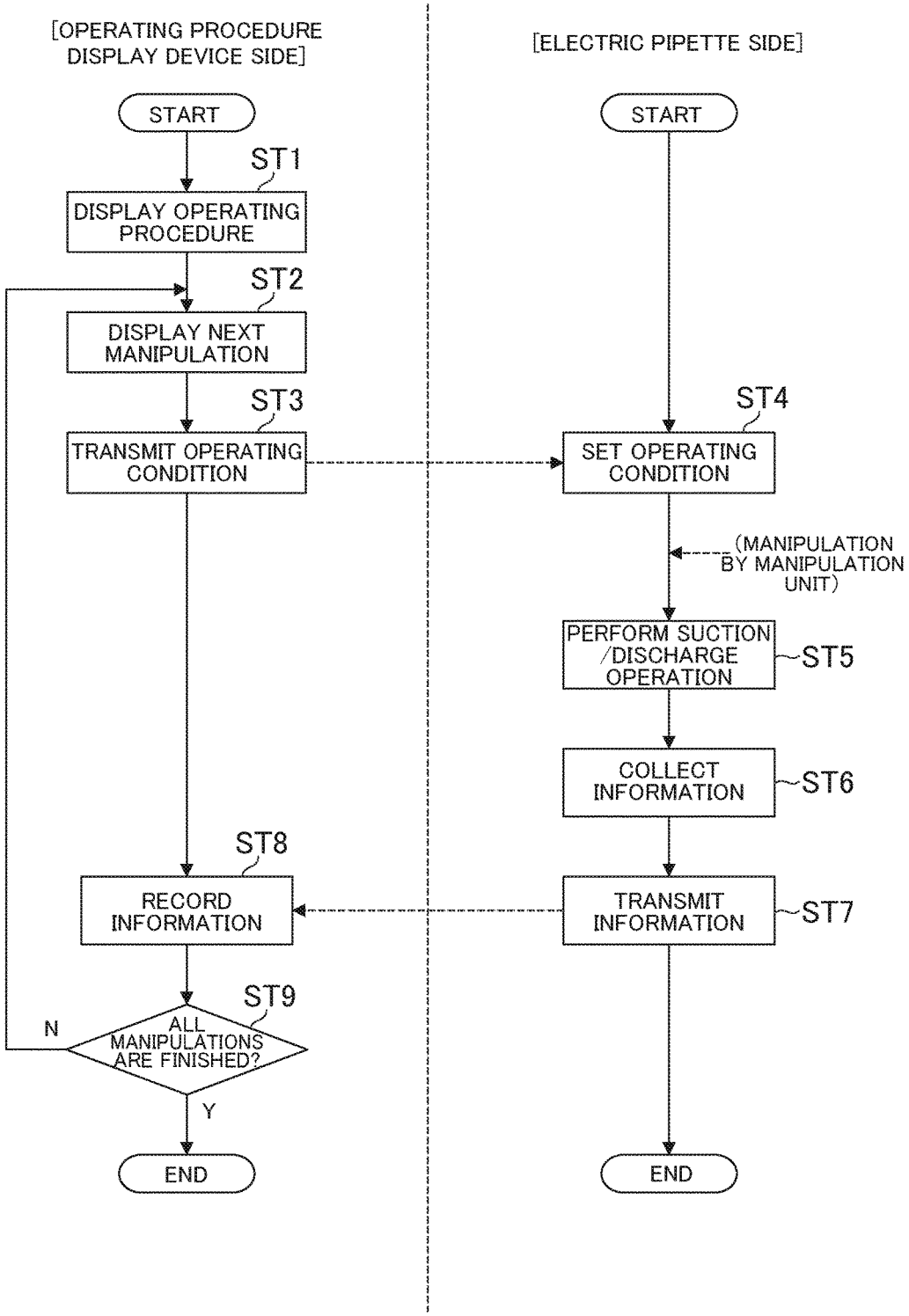
FIG. 6 is a flowchart for illustrating operation of the electric pipette system according to the first embodiment of the present invention.

FIG. 6 is a flowchart for illustrating operation of the electric pipette system 100 according to this embodiment. When the experiment starts, first, in the operating procedure display device 2, the operating procedure is displayed on the monitor 2h (Step ST1). Then, the manipulation to be performed next by the experiment operator is displayed (Step ST2), and the condition for operating the electric pipette 1 in that manipulation are transmitted to the electric pipette 1 (Step ST3).

In the electric pipette 1, the operating condition is set based on the received operating condition (Step ST4), and suction or discharge of the liquid is performed by driving the drive unit 11 in accordance with the manipulation of the manipulation unit 16 by the experiment operator (Step ST5). The information required during operation of the electric pipette 1 is collected by the information acquisition unit 14 (Step ST6), and that information is transmitted to the operating procedure display device 2 (Step ST7).

The operating procedure display device 3 sequentially records the received information (Step ST8), and judges whether or not all of the manipulations included in the operating procedure are finished (Step ST9). When, not all of the manipulations included in the operating procedure are finished (Step ST9: N), the processing returns to Step ST2, and the manipulation to be performed next by the experiment operator is displayed. When all of the manipulations included in the operating procedure are finished (Step ST9: Y), the processing is ended.

The information to be collected by the information acquisition unit 14 is now described.

First, time information on the time at which the manipulation is performed by the electric pipette 1 is important in order to prove that the experiment was correctly performed in accordance with the operating procedure. The time information may be any information that can specify the time point of the manipulation by the electric pipette 1. For example, the time information may be the day and month, the time of day, or both the day and month and the time of day. The time information may also be a relative time set with respect to a certain reference time. The record of the time information may be included in a clock function (i.e., clock circuit) of the electric pipette 1 itself so that the time information on the time at which the manipulation is performed may be acquired by the information acquisition unit 14, or the time information at the time point at which the information from the electric pipette 1 is received on the operating procedure display device 2 side may be recorded.

Whether the manipulation by the electric pipette 1 is suction or discharge, and the suction or discharge amount, are also very important in terms of proving that the experiment was performed correctly. Therefore, it is desired that at least, in addition to the time information on the time at which the manipulation by the electric pipette 1 is performed, whether the manipulation is suction or discharge, and the suction or discharge amount, also be recorded in the information recording unit 208.

The amount of liquid in the chip 9 may also be collected and recorded. When a manipulation has been performed by the electric pipette 1, but the suction or discharge of the liquid was unsuccessful due to a manipulation mistake by the experiment operator, for example, only detection of details of the drive of the drive unit 11 does not enable the fact that the manipulation was unsuccessful to be detected. However, detection of the amount of liquid in the chip 9 enables the fact that suction or discharge has been correctly performed to be proven. The detection of the amount of liquid can be performed by arranging an appropriate sensor in the chip connection portion 15, for example. The detection method is not particularly limited. Examples of the detection method may include detecting a liquid level in the chip 9 by an optical sensor or an ultrasonic sensor, calculating the amount of liquid sucked into the chip 9 or discharged from the chip 3 based on pressure fluctuations detected by a pressure sensor, and detecting the amount of liquid in the chip & by a capacitance sensor as a difference in capacitance.

The ID of the experiment operator manipulating the electric pipette 1 may be collected and recorded. This enables reliable confirmation that the person who is responsible for the experiment, is performing the experiment. The ID may be collected by, for example, using a receiver arranged in the electric pipette 1 to read ID information on a radio frequency (RF)-ID card distributed to the experiment operator in advance, or using a fingerprint sensor arranged in the electric pipette 1 to detect the fingerprint of the experiment operator. The ID may also be collected and recorded simply based on the ID and password entered by the experiment operator when logging on to the operating procedure display device 2. An ID unique to the electric pipette 1 may be recorded so that the ID of the electric pipette 1 may be collected and recorded together with, or in place of, the ID of the experiment operator. In this case, the electric pipette 1 used to perform the experiment is also recorded, and hence even when an abnormality occurs due to a trouble with the equipment, for example, this enables that fact to be identified.

The position of the electric pipette 1 may also be collected and recorded. The position of the electric pipette 1 becomes useful information for proving that each manipulation has been correctly performed, and that the experiment itself has been performed within the proper facility, when the position of the operations in the experiment, namely, the position of each container and device for example, is determined. The position may foe detected by using an arbitrary method. For example, a so-called local positioning system (LPS) may be arranged in the laboratory, and information on the position of the LPS detected by the electric pipette 1, or the position of the electric pipette 1 may be calculated based on image processing using an image obtained from a camera installed in the laboratory. As described later, when the electric pipette 1 is mounted to a manipulator, the position of the electric pipette 1 may also foe determined based on the coordinates of the manipulator when a manipulation is performed by the electric pipette 1.

A nature of the liquid in the chip 9 and an image of the liquid may also be collected and recorded. Regarding the nature of the liquid in the chip 3, the temperature and the pH, for example, may be detected by arranging an appropriate sensor in the chip connection portion 15, for example. Regarding the nature of the liquid itself in the chip 9, the type of information to be collected may be determined in accordance with the nature and the purpose of the experiment. The information to be detected is not particularly limited, and in addition to the above-mentioned temperature and pH, may be any information, for example, information on a sugar level and an optical density (OD). The image of the liquid in the chip 9 can be taken by mounting an optical camera to the chip connection portion 15, for example. When the physical nature of the liquid tends to change, for example, when the liquid tends to solidify, or tends to precipitate or separate, the state of the liquid at the time when the manipulation is performed can be recorded based on the taken image.

Information on replacement of the chip 9 may also be collected and recorded. The information on replacement of the chip 9 may be, for example, a piece of information indicating that the chip 9 itself has been replaced, or may be information indicating that the chip 9 has been removed or mounted. The removal and mounting of the chip 9 can be easily detected by arranging an appropriate mechanism, configured to detect the chip 9 in the chip connection portion 15, for example, a switch that is pressed downward when the chip 9 is mounted. The fact that the chip 9 is properly replaced during the experiment is very important in terms of proving that unintended mixing among the samples used in the experiment did not occur.

In the above description, the transmission of the operating condition to the electric pipette 1 from the operating procedure display device 2 is performed each time a manipulation is performed, however, a plurality of such transmissions may be collectively performed. For example, the operating condition for all of the manipulations included in the operating procedure may be transmitted in advance when the experiment is started so that the next operating condition, which has been received in advance, may be set by the electric pipette 1 each time a manipulation is performed.

In the above description, the transmission of information to the operating procedure display device 2 from the electric pipette 1 is performed each time a manipulation is performed. However, a plurality of such transmissions may be collectively performed. For example, a memory configured to temporarily store information may be arranged on the electric pipette 1 side so that the information may be sequentially stored in that memory and the information may be transmitted to the operating procedure display device 2 collectively when the experiment is finished. The information recording unit 208 itself may be arranged on the electric pipette 1 side. In this case, it is desired that a medium capable of being removed from the electric pipette 1 and read by an external device as appropriate, like a universal serial bus (USB) memory or a memory card, for example, be need for the information recording unit 208.

In the embodiment described above, the electric pipette 1 is described as being manipulated by the experiment operator while being held in his or her hand. However, the electric pipette 1 may be mounted to an automatic device like a manipulator so that the manipulations indicated in the operating procedure may be automatically performed.

Figure 7:
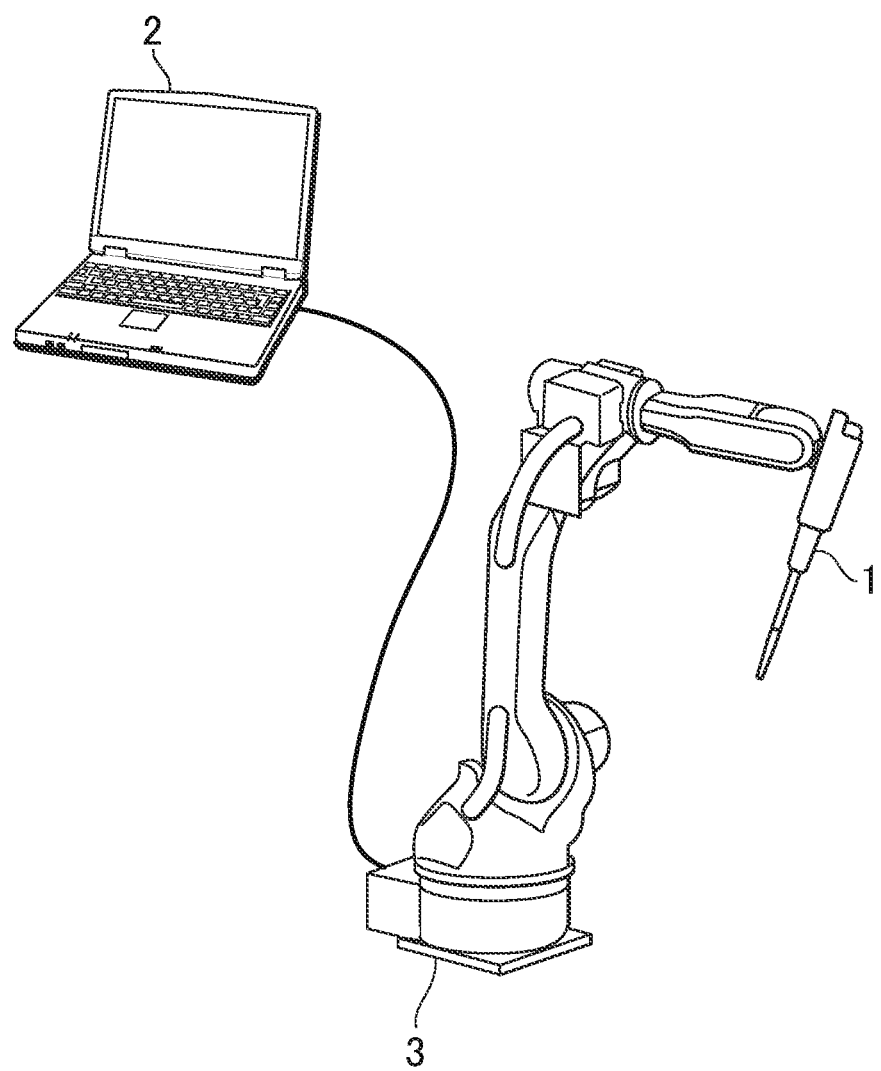
FIG. 7 is a schematic diagram for illustrating a configuration of an electric pipette system according to a second embodiment of the present invention.

FIG. 7 is a schematic diagram for illustrating a configuration of an electric pipette system 200 according to a second embodiment of the present invention. The electric pipette system 200 is different from that in the first embodiment in that the electric pipette 1 is mounted to a hand tip of a manipulator 3, which is an example of a transport apparatus, that the manipulator 3 and the operating procedure display device 2 can communicate to and from each other by a wired connection, and that the electric pipette 1 and the operating procedure display device 2 can communicate to and from each other via the manipulator 3. Similarly to the first embodiment, the electric pipette 1 and the operating procedure display device 2 may be configured to be capable of directly communicating to and from each other wirelessly or via a cable.

The configuration of the electric pipette 1 according to this embodiment is roughly the same as that in the first embodiment illustrated in FIG. 2. The only difference is that the drive instruction by the drive unit 11 is performed not by the manipulation of the manipulation unit 16, but by the communication from the manipulator 3. However, when the hand of the manipulator 3 is skillfully operated, the manipulator 3 may be used to manipulate the manipulation unit 16 in a similar manner to when the experiment operator manipulates the manipulation unit 16. The physical configuration of the operating procedure display device 2 according to this embodiment is the same as that in the first embodiment illustrated in FIG. 3.

Figure 8:
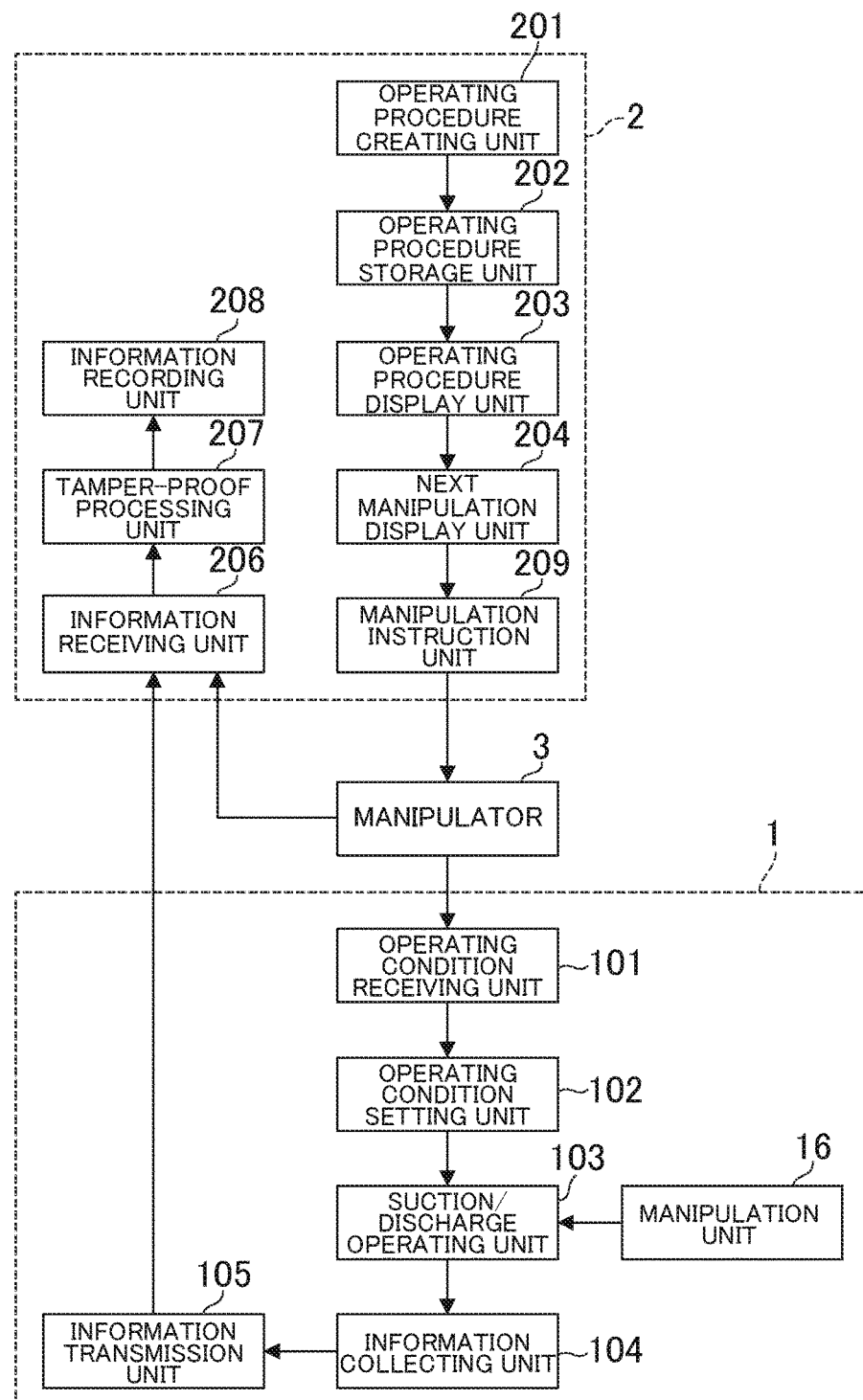
FIG. 8 is a function block diagram of the electric pipette system according to the second embodiment of the present invention.

FIG. 8 is a function block diagram of the electric pipette system 200 according to this embodiment. In FIG. 8, like parts to those in the first embodiment are denoted by like reference symbols, and a duplicate description thereof is omitted.

As illustrated in FIG. 8, in this embodiment, the operating procedure display device 2 includes a manipulation instruction unit 209 configured to instruct the manipulator 3 of the manipulation to be performed next. The manipulator 3 is configured to execute the manipulation instructed by the manipulation instruction unit 209 in accordance with an operating program stored in advance.

When the manipulation to be executed by the manipulator 3 is to use the electric pipette 1, the manipulator 3 transmits the operating condition received from the operating procedure display device 2 to the operating condition receiving unit 101 of the electric pipette 1 at the timing at which the electric pipette 1 is to be operated, sets the received operating condition, and causes the suction/discharge operating unit to execute a suction, or discharge operation based on the operating condition. In other words, the manipulation instruction unit 209 of this embodiment is configured to function as the operating condition transmission unit 205 of the first embodiment. This configuration enables the manipulator 3 to perform the operations performed, by the experiment operator in the first embodiment, which prevents human error and allows the amount of manpower required for the experiment to be reduced.

In the configuration illustrated in FIG. 3, the operating procedure display device 2 includes the operating procedure display unit 203 and the next manipulation display unit 204. As a result, the manipulator 3 of the electric pipette system 200 can easily grasp what type of experiment and what type of manipulation are currently being performed. However, those parts are not essential for the electric pipette system 200, and may foe omitted, or may be caused to function only when necessary. The operating condition may also be directly transmitted to the electric pipette 1 without being transmitted via the manipulator 3 by arranging, separately to the manipulation instruction unit 209, the operating condition transmission unit 205 (refer to FIG. 5) on the operating procedure display device 2 side.

The information receiving unit 206 is configured to collect information not only from the electric pipette 1, but also from the manipulator 3. Examples of the information to be collected from the manipulator 3 include, as described above, the coordinates of the manipulator 3 for obtaining the position of the electric pipette 1. Other information on the manipulator 3 may also be collected and recorded. The various types of information held by the manipulator 3 may serve to subsequently ensure the accuracy of the experiment, and serve as a basis for tracking how the experiment has been performed.

Figure 9:
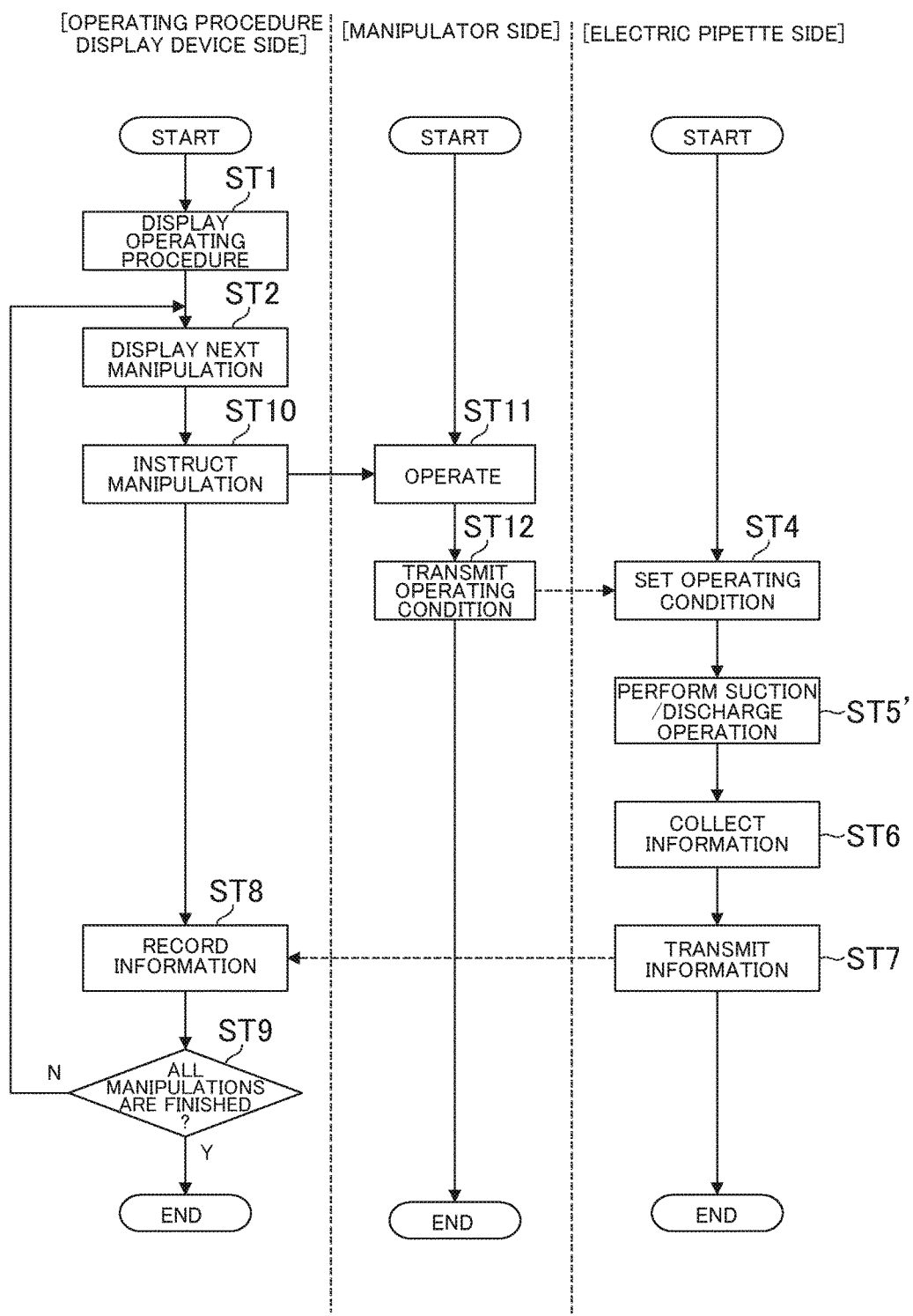
FIG. 9 is a flowchart for illustrating operation of the electric pipette system according to the second embodiment of the present invention.

FIG. 9 is a flowchart for illustrating operation of the electric pipette system 200 according to this embodiment. In FIG. 9, like operations to those of the electric pipette system 100 according to the first embodiment illustrated in FIG. 6 are denoted by like reference symbols, and a duplicate description thereof is omitted.

In this embodiment, the operating procedure display device 2 displays (when necessary) the next manipulation (Step ST2), and then transmits to the manipulator 3 an instruction to perform the manipulation to be executed next (Step ST10). The manipulator 3 operates in accordance with the manipulation instruction (Step ST11). At this point, when the manipulation is to use the electric pipette 1, the manipulator 3 transmits the operating condition to the electric pipette 1 (Step ST12).

Similarly to the first embodiment, the electric pipette 1 sets the operating condition based on the received operating condition, and then performs the suction or discharge operation (Step ST5'). The subsequent operations are the same as in the first embodiment.

In this example, the electric pipette 1 is configured to perform the suction or discharge operation immediately after setting the operating condition (Step ST5'). However, the electric pipette 1 may also be configured to wait until a signal instructing the suction or discharge operation is received from the manipulator 3, or wait until, like in the first embodiment, the manipulation unit 16 is manipulated by the manipulator 3.

Each of the configurations in the embodiments described above is described as an example, and the invention disclosed herein is not intended to be limited to those specific configurations themselves. Various modifications may be made by a person skilled in the art to the disclosed embodiments. For example, the shape, number, and arrangement of each member or apart thereof may be appropriately changed. Further, the control illustrated in the flowcharts may also be appropriately replaced by one having the same functions. It is to be understood that the technical scope of the invention disclosed herein cover all such modifications.

In other words, it should be understood by those skilled in the art that various modifications, combinations, sub-combinations and alterations may occur depending on design requirements and other factors insofar as they are within the scope of the appended claims or the equivalents thereof.

The invention claimed is:

1. An electric pipette system, comprising:
an operating procedure display device, and
an electric pipette
the electric pipette comprising:
a control unit, which is a micro controller configured to:
receive, from the operating procedure display device, an operating condition of a manipulation operation to occur next;
control the electric pipette to perform at least one of a suction operation and a discharge operation of a liquid by the electric pipette, based on the operating condition; and
collect various types of information during the suction operation or the discharge operation of the liquid;
an information transmission unit configured to communicate with the operating procedure display device;
wherein the operating procedure display device comprises a computer configured to:
receive, tamper-proof, and record, in that order, the various types of information collected by the control unit of the electric pipette;
receive information transmitted from the electric pipette; and
transmit information to the electric pipette;
wherein said tamper-proof is one selected from the group consisting of (1) adding a hash value to the received information; (2) adding an error detecting code to the received information; and (3) adding an electronic signature to the received information.

2. The electric pipette system according to claim 1, wherein the electric pipette is configured to collect, save, and transmit to the operating procedure display device:
times at which a manipulation operation is performed by the electric pipette,
information on whether the manipulation operation is a suction operation or a discharge operation, and
information on an amount of liquid used in the suction operation or the discharge operation.

3. The electric pipette system according to claim 2, wherein the electric pipette is further configured to collect, save, and transmit to the operating procedure display device at least one of an amount of a liquid in a chip, a nature of the liquid in the chip, and an image of the liquid in the chip.

4. The electric pipette system according to claim 2, wherein the electric pipette is further configured to collect, save, and transmit to the operating procedure display device at least one of an ID of an experiment operator and an ID of the electric pipette.

5. The electric pipette system according to claim 2, wherein the electric pipette is further configured to collect, save, and transmit to the operating procedure display device a position of the electric pipette.

6. The electric pipette system according to claim 2, wherein the electric pipette is further configured to collect, save, and transmit to the operating procedure display device information on replacement of the chip.

7. The electric pipette system according to claim 1, wherein the operating procedure display device is configured to:
display an operating procedure; and
display a manipulation operation to occur next.

8. The electric pipette system according to claim 1, wherein the control unit is configured to collect information on a conveyance apparatus configured to convey the electric pipette.

9. The electronic pipette system according to claim 1, wherein said tamper-proof is adding a hash value to the received information.

10. The electronic pipette system according to claim 1, wherein said tamper-proof is adding an error detecting code to the received information.

11. The electronic pipette system according to claim 1, wherein said tamper-proof is adding an electronic signature to the received information.

* * * * *